March 13, 1956　　C. C. BITTNER　　2,737,753
INSECT EXTERMINATOR
Filed Aug. 13, 1951　　2 Sheets-Sheet 1
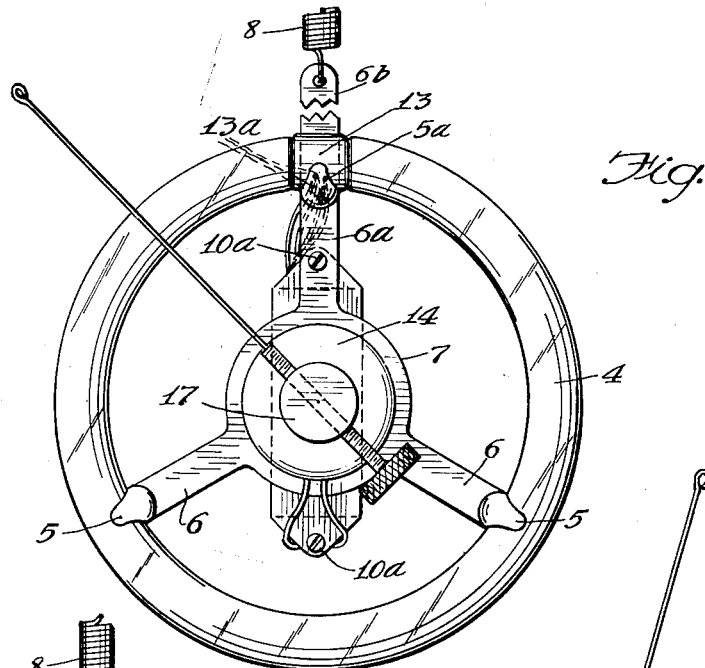
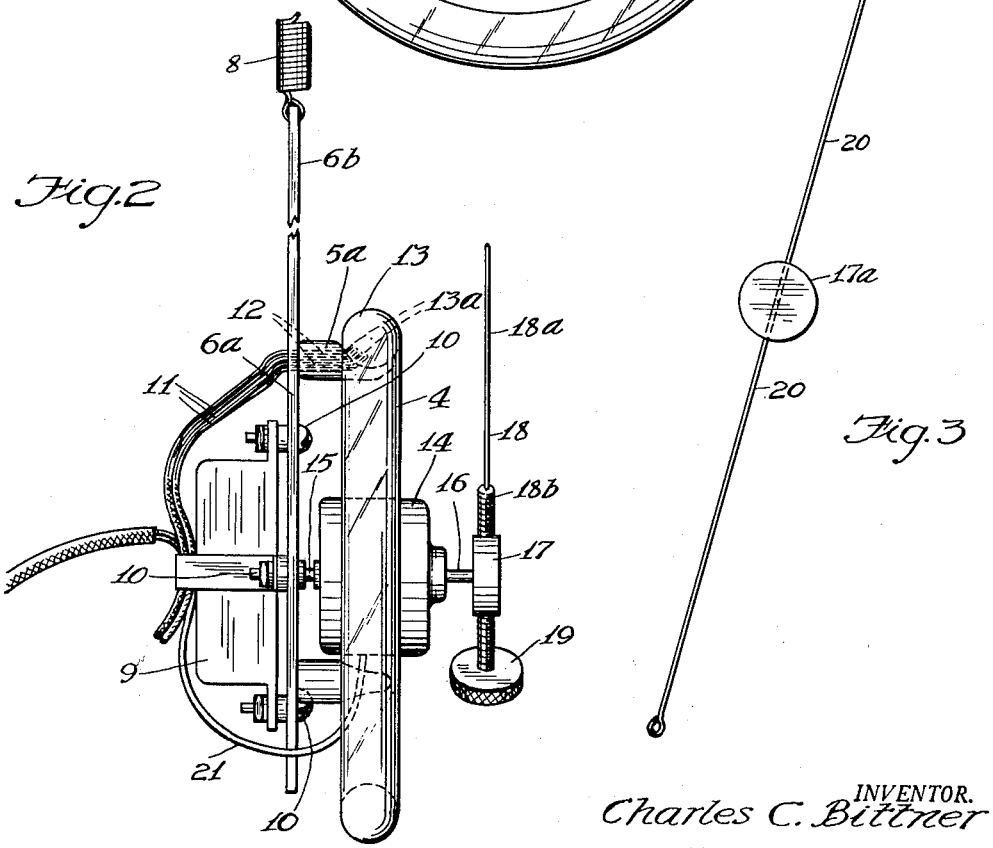
INVENTOR.
Charles C. Bittner
BY Edward W. Weinert
Attorney March 13, 1956 C. C. BITTNER 2,737,753
INSECT EXTERMINATOR
Filed Aug. 13, 1951 2 Sheets-Sheet 2

INVENTOR.
Charles C. Bittner
BY Edward W. Weivert
Attorney

United States Patent Office 2,737,753
Patented Mar. 13, 1956

2,737,753

INSECT EXTERMINATOR

Charles C. Bittner, Chicago, Ill.

Application August 13, 1951, Serial No. 241,554

8 Claims. (Cl. 43—113)

This invention relates to an insect exterminator and concerns itself with an insect attracting medium and an insect exterminating element which moves rapidly in a plane adjacent the attracting medium for striking and annihilating the insects.

More specifically, the invention consists of a circular fluorescent light tube with an electric motor mounted within the confines thereof with one or more insert whipping elements extending at an angle to the motor shaft and carried thereby, and adapted for striking and annihilating the insects as they converge upon the light.

In many localities in the country, there are swarms of insects which create much damage and which are highly objectionable to the inhabitants. At the present date, no effective way has been discovered for exterminating these insects and it is an object of this invention to provide mechanical means for exterminating these pests in a rapid and effective manner.

The invention comprises the novel structure and combination of elements hereinafter described and more particularly pointed out and defined in the appended claims.

In the accompanying drawing which illustrates a preferred form of this invention and in which similar reference numerals refer to similar features in the different views:

Fig. 1 is a front elevational view of an insect exterminator involving this invention;

Fig. 2 is a side elevational view of the same;

Fig. 3 is an elevational view of a modified form of the whipping mechanism;

Figure 4:
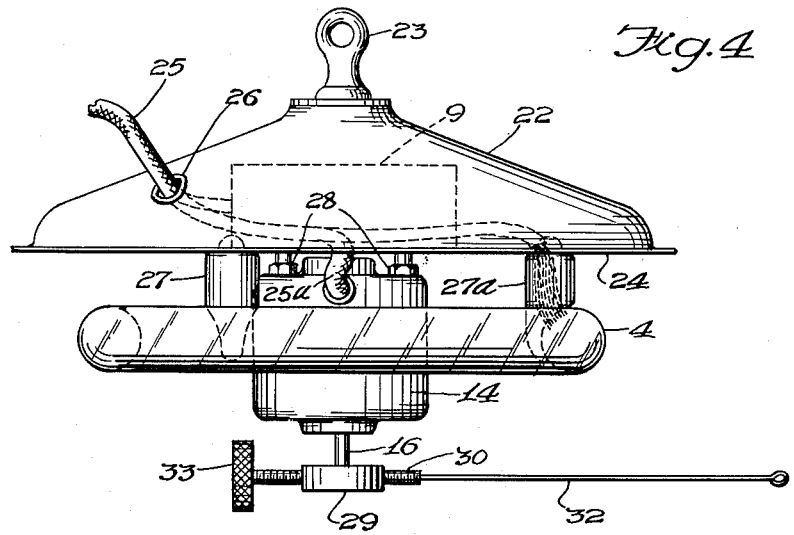
Fig. 4 is an elevational view of a modified form of the invention.

In referring now to the drawing and especially to Figs. 1 to 3, there is shown a circular fluorescent tube 4 which is supported upon lateral seats 5 and 5a attached respectively to arms 6 and 6a extending from a spider plate 7. The arm 6a has an extension 6b to which a coiled spring 8 is attached for supporting the device in suspended vertical position. However, the device may be supported in a horizontal position or any angular position, if desirable.

A ballast 9 of well known construction is attached to one side of the plate 7 by means of bolts 10 and to the arm 6a by means of bolts 10a. Suitable electrical conductors 11 extend from the ballast 9 to the shank of seat 5a which has suitable sockets 12 for the conductors 11. The tube 4 has the usual plug ring 13 with prongs 13a which fit the sockets 12 in a manner well known in the art.

An electric motor 14 is attached to the other side of the spider plate 7 by suitable means such as bolts 15 so that the said motor is located substantially centrally of the fluorescent tube 4. It is, however, contemplated to mount the motor in any other desirable way or manner.

The motor shaft 16 has secured upon its outer end a disk 17 through which a whipping element 18 is threaded for proper adjustment. The whipping element is spaced from the tube a distance greater than the width of said tube. This whipping element comprises a flexible whip-like metal element 18a extending from a relatively long screw 18b which is adjustable in the disk 17 and which carries a counterweight 19 at its outer end beyond the disk 17. The slender whipping element 18a extends considerably beyond the outer circumference of the tube 4 in order to annihilate insects approaching or leaving the outer circumference. The element 18a is in the form of a wire or slender wire rod that will obviously glide thru the air without material disturbance of the air or noise that would tend to repel insects. Whatever noise made by the revolving rod 18a would be in the nature of a humming sound that would attract the insects.

In Fig. 3, there is shown a slight modification in which the disk 17a upon the motor shaft supports a plurality of whipping elements 20, two in the present instance, which are mounted in the same radial plane and in balanced relation. Any number of whipping elements may be used and they may be mounted upon the disk 17a in any desired or approved manner. However, a single whipping element is preferred to avoid the creation of air currents which would drive the insects away.

In practice, it has been discovered that the light transmitted by a fluorescent tube is an excellent medium for attracting insects which converge toward such light in swarms only to be annihilated in large masses as they circulate about the tube or fly into the sphere of action of said slender element.

In use, the motor conductors 21 are adapted to be connected to a source of electrical energy for operating the same at a suitable speed which may be 1600 R. P. M. Operation of the motor will rapidly revolve the whipping element in a plane suitably spaced from the fluorescent tube 4. This spinning movement of the whipping element will strike and quickly destroy large masses of insects converging toward the fluorescent light or circulating thereabout. On account of the slender character of the whipping element and the fact that its rotation at about 1600 R. P. M. is not excessive it will not create any appreciable air current that would tend to drive the insects away.

Figure 5:
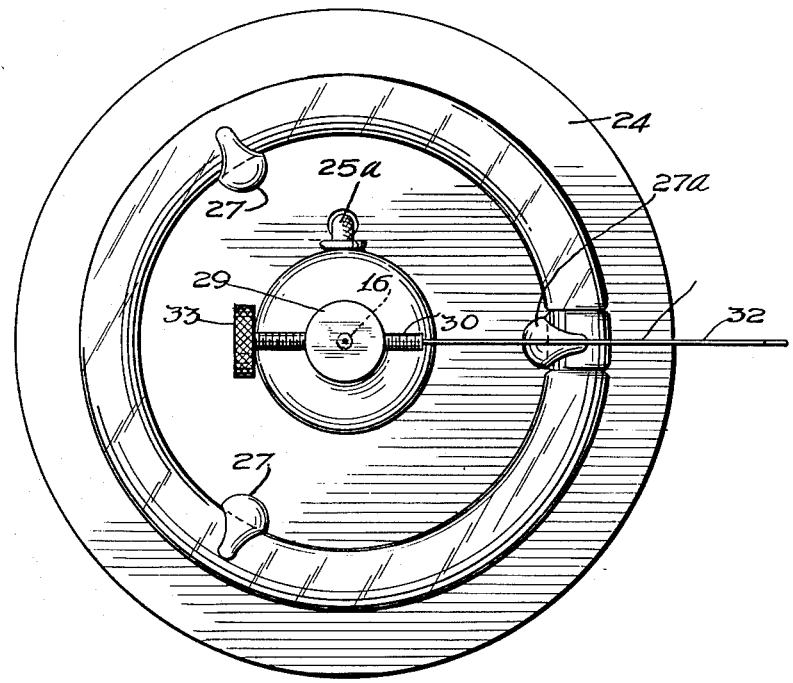
Fig. 5 is a bottom plan view of Fig. 4.

In Figs. 4 and 5, there is shown a modified form of the invention which comprises the mounting of a shade or hood 22 over the upper part of the fluorescent tube 4 and providing the apex of said hood with a supporting attachment 23 for suspending the device. The shade, which diverges from the apex, has a bottom closed by a plate 24 forming a chamber in the shade or hood for housing and supporting the ballast 9 which is similar to that in the first form. The electrical current is led to the ballast through the cable of conductors 25 extending through a hole 26 in the shade.

The circular fluorescent tube 4 is attached to arms 27 and 27a fastened upon plate 24 in a manner similar to the first form and the electric motor 14 is supported centrally of the tube by bolts or connectors 28 secured to plate 24. The ballast 9 is connected with the motor by conductor 25a and with the ring 4 through arm 27a in a manner similar to the first form as shown in dotted lines.

The outer end of the motor shaft 16 carries a disk 29 through which extends a threaded stem 30 which adjustably supports a slender whipping element 32; the stem 30 being provided with an adjusting head whereby the whipping element may be lengthened or shortened.

In the use of such a device as shown in the modified form, the shade or hood 22 prevents the rays of light from ascending above the ring to illuminate a branch of a tree thereabove should the device be supported upon a tree, or to illuminate any support above the ring upon which insects might gather and avoid being exterminated. With the use of the hood, the insects are compelled to fly down beneath the hood to get to the light and they will be annihilated by the rapidly rotating whipping element as they converge upon the light or as they circulate about the fluorescent tube. The fluorescent tube has been found to be the most attractive lighting medium for insects and bugs and they will converge upon it in swarms and be quickly annihilated, until few, if any, remain.

I am aware that many changes may be made and various details may be modified without departing from the principles of this invention so I do not propose limiting the patent granted otherwise than necessitated by the appended claims.

I claim:

1. In an insect exterminator, a circular light producing tube, a motor, means for supporting said motor within the confines of said tube, said motor having a shaft extending beyond the plane of said tube, a single element extending at right angles to said shaft in a plane spaced from the plane of said tube, said element having a slender whipping portion upon one side of said shaft and extending beyond the circumference of the tube, a counter weighted portion upon the opposite side of said shaft for balancing said whipping portion and means for supplying energy to said motor and tube.

2. In an insect exterminator, a circular light producing tube, a motor, means for mounting said motor within the confines of said tube with provision for the passage of insects between said motor and tube, said motor having a shaft extending beyond the plane of said tube, a single slender and counterweighted whipping element mounted upon said shaft in a plane spaced from said tube and extending beyond the outer circumference of said tube and means for operating said motor and illuminating said tube.

3. In an insect destroyer, a shade having a supporting attachment for suspending said destroyer, a circular fluorescent tube supported from said shade in a plane beneath said shade, a motor supported centrally of said tube with provision for the passage of insects between said motor and tube, said motor having a shaft extending beyond the plane of said tube, a single, slender and counterweighted insect whipping element secured to said shaft in a plane spaced from the tube a distance greater than the width of said tube and extending an appreciable distance beyond the outer circumference of the tube for annihilating insects approaching in the plane of said element and means for supplying electrical energy to said motor and tube.

4. In an insect destroyer, a shade diverging from the top to the bottom and having a closure plate at the bottom, forming a chamber in the shade, said shade having an upper suspension means for freely supporting said destroyer, a circular fluorescent tube supported from said closure plate in a plane parallel to said plate, a motor supported from said plate centrally of said tube with a downwardly extending shaft, a single slender and counterweighted insect whipping element carried by said shaft in a plane spaced a distance from the plane of said tube and extending a distance beyond the circumference of said tube and means including a ballast in said chamber for supplying electrical energy to said tube and motor.

5. In an insect destroying device, a circular light producing tube in a horizontal plane, a motor supported within the confines of said tube with a downwardly extending shaft, a single slender and counterweighted insect annihilating element carried by said shaft in a plane spaced from the tube a distance greater than the width of said tube and extending a distance beyond the circumference of said tube, a shade supported over the top of said tube for obstructing the upward movement of light rays, suspension means upon the top of said shade for supporting said device and means for supplying electrical energy to said tube and motor.

6. In an insect destroying mechanism, a circular fluorescent tube, a motor, means for supporting said motor within the confines of said tube with provision for the passage of insects between said motor and tube, said motor having a shaft extending beyond the plane of said tube, a single slender and counterweighted insect whipping element secured to said shaft in a plane spaced from the plane of said tube and extending beyond the circumference of said tube, said element being rotated about 1600 R. P. M. and means for supplying electrical energy to said tube and motor.

7. In an insect destroying mechanism, a circular fluorescent tube, a motor, means for supporting said motor centrally of said tube with provision for the passage of insects between said motor and tube, said motor having a shaft extending beyond the plane of said tube, a single slender and counterweighted insect destroying element secured on said shaft in a plane spaced from the tube a distance greater than the width of said tube and extending a distance beyond the circumference of said tube, means for suspending said mechanism and means for supplying electrical energy to said tube and motor.

8. In an insect destroying mechanism, a circular light producing tube, a motor, means for supporting said motor centrally of said tube with the provision for the passage of insects between said motor and tube, said motor having a shaft extending beyond the plane of said tube, a single slender and counterweighted insect destroying element secured to said shaft in a plane spaced from said tube and extending beyond the circumference of said tube, said motor rotating said element about 1600 R. P. M. and means for energizing said motor and tube.

References Cited in the file of this patent

UNITED STATES PATENTS

| Number | Name | Date |
|---|---|---|
| 118,870 | Mee | Sept. 12, 1871 |
| 394,205 | Neef | Dec. 11, 1888 |
| 503,945 | Conard | Aug. 29, 1893 |
| 981,459 | Moncus | Jan. 10, 1911 |
| 1,036,331 | Plumer | Aug. 20, 1912 |
| 1,164,596 | Cox | Dec. 14, 1915 |
| 1,302,972 | Rea | May 6, 1919 |
| 1,445,906 | Noonan | Feb. 20, 1923 |
| 1,801,778 | MacGahan | Apr. 21, 1931 |
| 1,807,076 | Sweet | May 26, 1931 |
| 1,819,551 | Gourdon | Aug. 18, 1931 |
| 2,013,969 | Menasche | Sept. 10, 1935 |
| 2,079,044 | Santmyer | May 4, 1937 |
| 2,575,720 | Lenehan | Nov. 20, 1951 |
| 2,581,185 | Gordon | Jan. 1, 1952 |

FOREIGN PATENTS

| Number | Country | Date |
|---|---|---|
| 106,260 | Sweden | Jan. 5, 1943 |
| 215,941 | Great Britain | May 22, 1924 |
| 427,384 | Italy | Nov. 18, 1947 |
| 539,883 | Great Britain | Sept. 26, 1941 |

OTHER REFERENCES

Science, Jan. 15, 1932, vol. 75; No. 1933, page 78.